US008681836B2

(12) United States Patent
Laud

(10) Patent No.: US 8,681,836 B2

(45) Date of Patent: Mar. 25, 2014

(54) REPEATER USING BASEBAND DATA

(75) Inventor: Timothy G. Laud, Libertyville, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 441 days.

(21) Appl. No.: 12/969,960

(22) Filed: Dec. 16, 2010

(65) Prior Publication Data

US 2012/0155513 A1 Jun. 21, 2012

(51) Int. Cl.

*H04B 7/14* (2006.01)

*H04L 25/52* (2006.01)

(52) U.S. Cl.

USPC ........................ 375/211; 375/240.28; 725/127

(58) Field of Classification Search

USPC ........ 375/211, 240.26, 240.28; 370/315, 326, 370/501; 725/127

See application file for complete search history.

(56) References Cited

U.S. PATENT DOCUMENTS 6,650,374 B2 * 11/2003 Choi et al. .................... 348/723
6,829,317 B2 * 12/2004 Mege et al. .................. 375/211

* cited by examiner

*Primary Examiner* — Betsy Deppe

(57) ABSTRACT

A repeater receives an input signal containing mobile/hand-held (M/H) data received in an M/H frame equivalent in size to 20 VSB data frames. Each VSB frame contains an odd VSB field and an even VSB field, and each of the VSB fields includes one field sync segment and 312 data segments. The M/H frame includes main data and M/H data, and the M/H data has more robust coding than the main data. The received input signal is demodulated to produce an MPEG transport steam. Frame registration is used to find data and field syncs in the MPEG transport steam. The trellis encoder is reset prior to M/H training data in to the mobile data stream. The data is VSB modulated, the field syncs are added to the modulated data to reconstruct the M/H frame, and the M/H frame upconverted to an RF output signal, which is retransmitted.

3 Claims, 1 Drawing Sheet

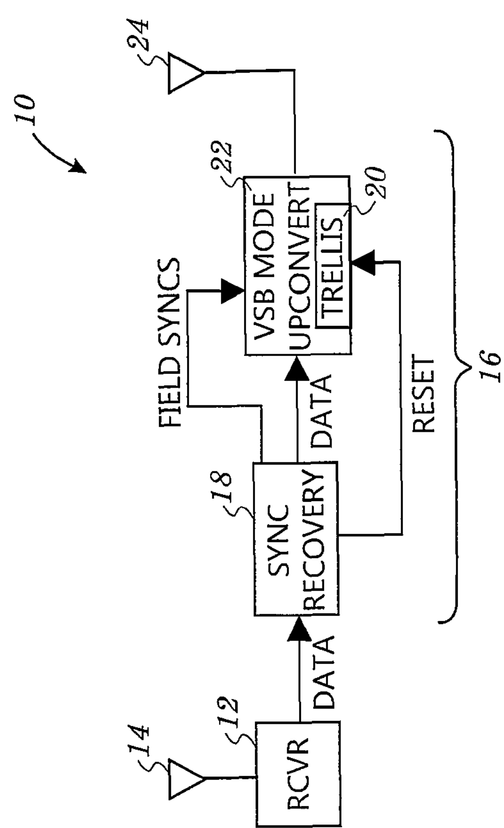
10
24
22
20
VSB MODE
UPCONVERT
TRELLIS
FIELD SYNCS
DATA
RESET
16
18
SYNC
RECOVERY
DATA
14
12
RCVR

REPEATER USING BASEBAND DATA

RELATED APPLICATION

The present application contains disclosure similar to disclosure contained in application (7288/7289).

TECHNICAL FIELD

A repeater that receives a signal and passes the signal on to receivers or other repeaters is described herein.

BACKGROUND

The ATSC transmission scheme set out in the ATSC A/53 Standard involves the use of 8-VSB modulation in transmitting terrestrial broadcasts for digital television receivers. An ATSC A/53 field (an ATSC A/53 frame has odd field and an even field) contains a field sync segment and 312 data segments each beginning with a segment sync. The data segments also include main data. ATSC A/53 is optimized for fixed reception.

Unfortunately, transmissions according to this standard are not robust enough against doppler shift and multipath radio interference in mobile environments because this standard is designed for slowly varying signal conditions. In order to provide robust reception in spite of doppler shifts and multipath radio interference in mobile environments, additional channel coding mechanisms are introduced in the ATSC A/153 Standard to protect the signal.

The A/153 Standard describes the ATSC Mobile DTV system referred to in the Standard as the ATSC mobile/handheld (M/H) system. The M/H system provides mobile/pedestrian/handheld broadcasting services using a portion of the ATSC 8-VSB payload, while the remainder is still available for HD and/or multiple SD television services. The M/H system is a dual-stream system that includes the ATSC service multiplex for existing digital television services and the M/H service multiplex for one or more mobile, pedestrian and handheld services.

Thus, the ATSC A/153 Standard known as ATSC-M/H is a standard for mobile digital televisions that allows television broadcasts to be received by mobile devices. ATSC-M/H is an extension to the available digital TV broadcasting standard ATSC A/53.

According to Part 2 of the A/153 Standard, one M/H Frame can carry main data (processed in accordance with the A/53 Standard) and M/H data (processed in accordance with the A/153 Standard) and is equivalent in size to exactly 20 VSB data frames. The M/H Frame consists of five consecutive Sub-Frames such that each Sub-Frame contains the same amount of data as four VSB data frames or eight A/53 data fields. Each Sub-Frame consists of sixteen consecutive M/H Slots. Each M/H Slot consists of 156 transport stream packets or equivalently 156 data segments at the symbol level, i.e., equivalent to one half of a A/53 data field. A particular Slot may contain M/H data, a combination of M/H data and main data, or only main data. If an M/H Group is transmitted during an M/H Slot, then the first 118 transport stream packets in the Slot belong to an M/H Group, and the remaining 38 packets are main data packets. If there is no M/H Group in an M/H Slot, the M/H Slot contain 156 main data packets. As in the case of an A/53 field, an A/153 field has a field sync segment and each data segment includes a segment sync portion.

Currently, a digital transmission repeater has two options. It can decode the received signal to baseband and recode the baseband data as a clean signal. Alternatively, it steps down the received signal to IF for filtering and steps up the signal at IF to RF with the same noise and multipath degradation of the received signal.

As to the first option, without additional steps, M/H data is lost when the received signal contains M/H data. As to the second option, the number of repeaters is succession is limited.

Accordingly, it is desirable to have a repeater that solves one or more of these or other problems.

BRIEF DESCRIPTION OF THE DRAWINGS

The single FIGURE of the Drawing is a block diagram of a repeater described herein.

DETAILED DESCRIPTION

As shown in the FIGURE, a repeater 10 has a receiver 12 that receives and demodulates a VSB television signal supplied by a VSB transmitter over the air to an antenna, over a cable to a connector, or otherwise. The antenna, connector, or other carrier is represented by reference number 14 in the FIGURE. The receiver 12, for example, may be a receiver manufactured according to the ATSC Digital Televisions Standard A/153. Thus, the receiver 12 receives and demodulates VSB television signal and outputs an MPEG transport stream.

The demodulated VSB television signal (i.e., the MPEG transport stream) from the receiver 12 is provided to a processor 16 such as a post-processor. The processor 16 includes a frame registration find block 18, a trellis code block 20, and a VSB modulation and upconvert block 22. The processor 16, for example, may be one or more elements of a computer. The computer, for example, may include memory, one or more input devices such as a mouse and/or a keyboard, one or more output devices such as a display and/or a printer, one or more processing elements such as a microprocessor, etc. In this case, the blocks of the processor 16, for example, may be blocks of code executed by the processor 16. Alternatively, each of the blocks of the processor 16 or various combinations of the blocks of the processor 16 may be hardware and/or firmware such as ASICs or other ICs.

The frame registration find block 18 finds the frame registration (i.e., location or structure of the M/H frame) in the demodulated VSB television signal provided by the receiver 12. Finding frame registration enables the processor 16 to find the location of the field syncs and main and mobile data in the transport stream frames. The frame registration find block 18 may find the frame registration in a number of ways.

For example, the frame registration find block 18 may locate the M/H training sequence in the MPEG transport stream provided by the receiver 12. The location of the training sequence in the demodulated VSB television signal provided by the receiver 12 is predetermined even though the demodulated VSB television signal provided by the receiver 12 is deinterleaved by the receiver 12. Because the training sequence is repeated at predetermined locations in the frame, the frame registration find block 18 can use this information to locate the byte pattern corresponding to the training sequences. Once these locations are known, location of the signaling channel is also known as a fixed offset to the training sequences. The data of the signaling channel can then be decoded, using the inverse of the steps defined in ATSC A/153, and that data information can be used to determine the location of M/H frame sync. With this process, the frame structure within the MPEG transport stream provided by the receiver 12 is easily determined.

Alternatively, if the receiver 12 is conFIGUREd to provide an output corresponding to the frame sync of an A/53 frame, the frame registration find block 18 can use the A/53 frame sync to locate and decode the M/H signaling channel to determine the location of the M/H frame sync. This process can easily find the frame structure within the MPEG transport stream provided by the receiver 12.

As another alternative, the frame registration find block 18 can find the PID that identifies the packets containing main and mobile data. Because the main and mobile data have predetermined locations within the frame, the frame registration find block 18 can use the main and mobile PIDs to locate and decode the M/H signaling channel and easily locate the frame structure within the MPEG transport stream provided by the receiver 12.

Once the frame structure is located within the MPEG transport stream provided by the receiver 12, the frame registration find block 18 outputs the correctly timed field syncs and the data (main and M/H) contained in the frames. The data from the frame registration find block 18 is applied to the VSB modulation and upconvert block 22, which includes the trellis code block 20 that trellis encodes the data.

This data includes all main and mobile information including the signaling channel and training data.

The trellis code block 20 may operate in accordance with the A/53 Standard and use well known Viterbi encoders. The trellis code block 20 outputs the trellis encoded data.

The trellis code block 20 forces the trellis state of its trellis encoder to the zero state at the beginning of the M/H training sequence in the frame. Although it might be possible to not reset the trellis state thereafter, it is preferable to periodically reset the trellis state of the trellis encoder of the trellis code block 20 to the zero state. For example, the trellis state of this trellis encoder can be forced to the zero state once per second or once per M/H frame.

A VSB modulation and upconvert block 22 receives the field syncs, trellis reset, and data from the frame registration find block 18. The trellis reset is a timing signal that is synchronized to the beginning of the mobile training sequence. The beginning of the mobile training sequence is found by the sync recovery block 18. Synchronizing the trellis encoder of the trellis code block 20 by use of the trellis reset causes the VSB modulation and upconvert block 22 to produce trellis encoded data as specified in ATSC A/153 Part 2. The VSB modulation and upconvert block 22 VSB modulates the data from the frame registration find block 18 as 8 VSB data, structures the frames with the 8 VSB data and the field syncs from the frame registration find block 18, upconverts the frames to a desired channel, and supplies the upconverted signal to an antenna, to a cable connector to a connector, or otherwise for transmission. The antenna, connector, or otherwise is represented by reference number 24 in the FIGURE.

Accordingly, the repeater 10 completely demodulates (by way of the receiver 12) the received signal and remodulates (by way of the processor 16) the demodulated signal back to a pristine M/H signal.

Certain modifications of the present invention have been discussed above. Other modifications of the present invention will occur to those practicing in the art of the present invention.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of receiving, processing, and retransmitting an input signal containing mobile/handheld (M/H) data received in an M/H frame equivalent in size to 20 VSB data frames, wherein each VSB frame contains an odd VSB field and an even VSB field, wherein each of the VSB fields includes one field sync segment and 312 data segments, wherein the M/H frame includes main data and M/H data, and wherein the M/H data has more robust coding than the main data, the method comprising:

receiving and demodulating the input signal to produce an MPEG transport steam;

finding frame registration so as to find data and field syncs in the MPEG transport steam;

synchronizing a trellis reset at a beginning of a mobile training data sequence to produce trellis encoded data having output levels that are set to predetermined levels;

VSB modulating all of the MPEG transport stream, adding the field syncs to the modulated data to reconstruct the M/H frame, and upconverting the M/H frame to an RF output signal; and, retransmitting the RF output signal.

2. A system that receives, processes, and retransmits an input signal containing mobile/handheld (M/H) data received in an M/H frame equivalent in size to 20 VSB data frames, wherein each VSB frame contains an odd VSB field and an even VSB field, wherein each of the VSB fields includes one field sync segment and 312 data segments, wherein the M/H frame includes main data and M/H data, and wherein the M/H data has more robust coding than the main data, the system comprising:

a receiver that receives and demodulates the input signal to produce an MPEG transport steam;

a frame registrar that finds frame registration so as to find data and field syncs in the MPEG transport steam and that produces a trellis reset;

a VSB modulator and upconverter that, in response to the trellis reset, VSB modulates trellis encoded data, adds the field syncs to the modulated data to reconstruct the M/H frame, upconverts the M/H frame to an RF output signal, and that retransmits the RF output signal.

3. A method of receiving, processing, and retransmitting an input signal containing mobile/handheld (M/H) data received in an M/H frame equivalent in size to 20 VSB data frames, wherein each VSB frame contains an odd VSB field and an even VSB field, wherein each of the VSB fields includes one field sync segment and 312 data segments, wherein the M/H frame includes main data and M/H data, and wherein the M/H data has more robust coding than the main data, the method comprising:

receiving and demodulating the input signal to produce an MPEG transport steam;

finding frame registration so as to find data and field syncs in the MPEG transport steam; and synchronizing a trellis reset at a beginning of a mobile training data sequence to produce trellis encoded data having output levels that are set to predetermined levels.

* * * * *